US008850518B2

(12) United States Patent
Naccache

(10) Patent No.: US 8,850,518 B2
(45) Date of Patent: Sep. 30, 2014

(54) METHOD AND DEVICE FOR USER AUTHENTICATION

(75) Inventor: David Naccache, Paris (FR)

(73) Assignee: Ingenico, Neuilly-sur-Seine (FR)

( * ) Notice: Subject to any disclaimer, the term of this patent is extended or adjusted under 35 U.S.C. 154(b) by 1312 days.

(21) Appl. No.: 11/760,063

(22) Filed: Jun. 8, 2007

(65) Prior Publication Data

US 2008/0077977 A1    Mar. 27, 2008

(30) Foreign Application Priority Data

Jun. 13, 2006 (FR) ..................................... 06 05240

(51) Int. Cl.
*G06F 7/04* (2006.01)
*H04L 9/32* (2006.01)

(52) U.S. Cl.
CPC ............ *H04L 9/3228* (2013.01); *H04L 9/3271* (2013.01)
USPC .............................................. 726/2; 380/229

(58) Field of Classification Search
USPC ............ 726/2–9, 12, 17–21, 27–30; 713/155, 713/159, 166, 168, 170–172, 181–185; 380/1, 228–233; 705/52, 55, 67, 18; 711/163–164, 167, 216; 707/689, 747; 709/203, 225
See application file for complete search history.

(56) References Cited

U.S. PATENT DOCUMENTS

| | | | | |
|---|---|---|---|---|
| 6,067,621 | A * | 5/2000 | Yu et al. | 713/172 |
| 7,069,438 | B2 * | 6/2006 | Balabine et al. | 713/168 |
| 7,114,080 | B2 * | 9/2006 | Rahman et al. | 713/186 |
| 7,478,434 | B1 * | 1/2009 | Hinton et al. | 726/27 |
| 7,624,181 | B2 * | 11/2009 | Townsley et al. | 709/225 |
| 7,725,723 | B2 * | 5/2010 | Landrock et al. | 713/176 |

FOREIGN PATENT DOCUMENTS

| | | |
|---|---|---|
| EP | 1331753 A2 | 7/2003 |
| WO | 9847258 A2 | 10/1998 |
| WO | 2005029746 A2 | 3/2005 |

OTHER PUBLICATIONS

Preliminary Search Report, French Patent Application 0605240.
Written Opinion on Patentability of Invention, French Patent Application 0605240.

\* cited by examiner

*Primary Examiner* — Joseph P. Hirl
*Assistant Examiner* — Leynna Truvan
(74) *Attorney, Agent, or Firm* — Marsh Fischmann & Breyfogle LLP

(57) ABSTRACT

A method is provided for user authentication, comprising:
provision of a client device provided with an encryption function of variables K, t, x, in which:
K is a secret shared by the server and the client device;
t is a time-dependent variable; and
x is a variable having at least two values,
a step of calculation (S30) by the client device of a first value of the function obtained for a first value of x, for authentication of the user by the server; and
a step of calculation (S80, S110) by the client device of a second value of the function, obtained for a second value of x, for verification of the user authentication by the server.
Also provided is a user authentication device with means of calculation of values of said function.

12 Claims, 2 Drawing Sheets

METHOD AND DEVICE FOR USER AUTHENTICATION

Figure 1:
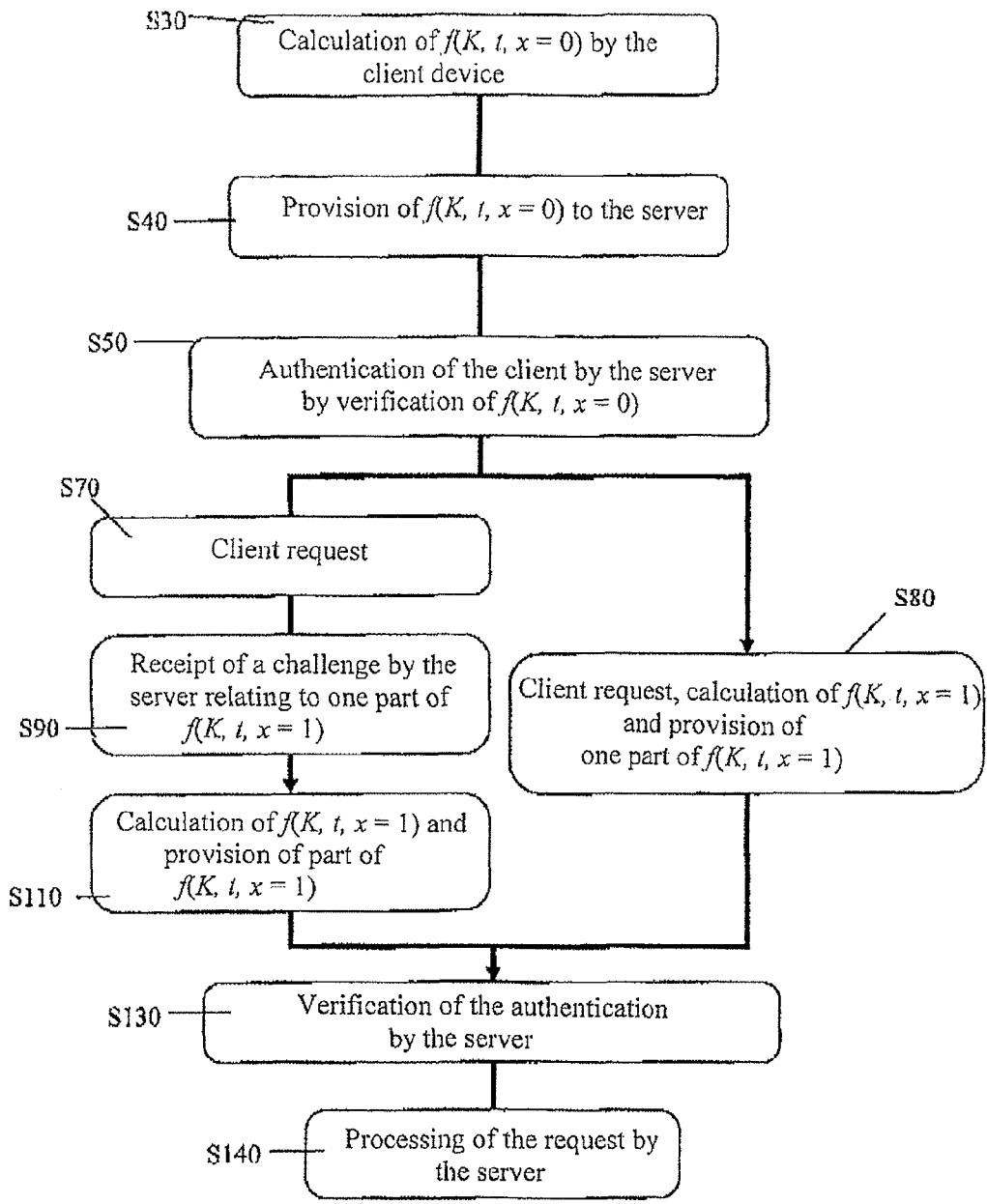

The present invention relates to a method and a device for user authentication. In particular, the invention relates to generating single-use passwords.

Authentication by a password is known. The password is kept secret by the user to ensure that a third party does not have the same right of access. The ability to generate the password is regarded as proof and is accepted by a device or administration service as authority for user access. The password technique forms part of those authentication systems termed "weak".

A drawback of this method is associated with the static nature of the authentication information: a third party may crack the password, after which he has the same access right as the user. A solution to this problem is provided by single-use password systems (or "one-time passwords" hereafter referred to as OTPs), in which passwords are valid for a single transaction.

Among such systems, systems of the asynchronous or challenge/response type are known. When a user desires to be authenticated by a server, the latter generates a challenge (for example random), and transmits it to the user. The user captures the challenge on a client device. This device then generates the OTP by hash function and encryption algorithms. The user transmits the OTP to the server, which has available all the information for its verification, after which the user is authenticated.

Synchronous systems are also known, in which the operation generally remains the same, apart from the fact that the challenge corresponds to the current time (it is thus implicit) or to a counter internal to the device (for example a number incremented at each use). The client device is for example an authentication token that the user carries with him, which is used to generate passwords allowing the server to authenticate the user. An authentication token can take various forms: card, mini-calculator, key ring, etc. The latter technique is easier as the user does not need to key-in the challenge. However, it requires synchronization between the client device and the server.

For example, the RSA SecurID system comprises a client device (i.e. a token) that generates single-use passwords based on time and a shared secret. More particularly, the devices in question contain a unique symmetrical key combined with an algorithm that generates a code every 60 seconds. Associated with a personal user code, a device of this type allows strong identification to be achieved. Since the figure obtained is dynamic, it is difficult to predict. It is therefore difficult for a hacker to break the code corresponding to a particular moment. A particular technology is used to synchronize each device with the security server.

A first drawback of this system is that the client device generates a password at regular intervals, which is sometimes unnecessary, even incompatible with certain applications. Moreover, this consumes energy.

Another drawback derives from the fact that any attacker having captured the shared secret can reproduce the passwords. One risk is thus a fork bomb attack (also hi-jacking). In fact, authentication takes place at the moment of connection. Once past this authentication, there is no verification that authentication is always correct. It is also possible to divert a communication, for example of the TCP/IP type or a DTMF transmission. Once the diversion has been carried out, the server dialogues with the attacker, and the attacker uses the victim's session.

Thus, there is a need for a simple solution to the drawbacks mentioned above.

In one aspect, the invention relates to a method for user authentication by a server, comprising:
providing a client device provided with an encryption function for variables K, t, x, in which:
K is a secret shared by the server and the client device;
t is a time-dependent variable; and
x is a variable having at least two values,
a step of calculation by the client device of a first value of the function obtained for a first value of x, for the verification of authentication of the user by the server; and
a step of calculation by the client device of a second value of the function obtained for a second value of x, for verification of the authentication of the user by the server.

In the preferred embodiments, the method according to the invention comprises one or more of the following characteristics:
the method according to the invention also comprises, after the first step of calculation, the steps of:
providing the first value to the server;
authentication of the user by the server, using the first value provided; and
user request to the server, the method also comprising, after the second calculation step, the steps of:
providing the server with at least one part of the second value; and
verifying of the user authentication by the server, using said at least one part of the second value;
the method of authentication according to the invention also comprises, between the calculation steps, a step of:
the user receiving a challenge from the server, involving at least one part of the second value;
at one and/or the other calculation steps, the function uses a concatenated value of variables K, t and x,
the variable x is a one-bit-coded variable; and
the function comprises a hash function.

In another aspect, the invention relates to a user authentication device, provided with an encryption function of variables K, t, x, in which:
K is a secret shared with a server;
t is a time-dependent variable; and
x is a variable having at least two values,
the device comprising:
means of calculation of the function values for one or other of said at least two values of x.

In the preferred embodiments, the device according to the invention comprises one or more of the following characteristics:
the device according to the invention also comprises:
means for the user to change the variable x; and
means of activation by the user of the calculation of the function values by the device;
the means of modification and activation are integrated;
the device according to the invention also comprises means for displaying a function value, comprising separate sections of the display, the device being capable of displaying parts of a function value in respective display sections.
the means of calculation is capable of calculating a function value using a concatenated value of variables K, t and x; and
the variable x is a one-bit-coded variable.

Figure 2:
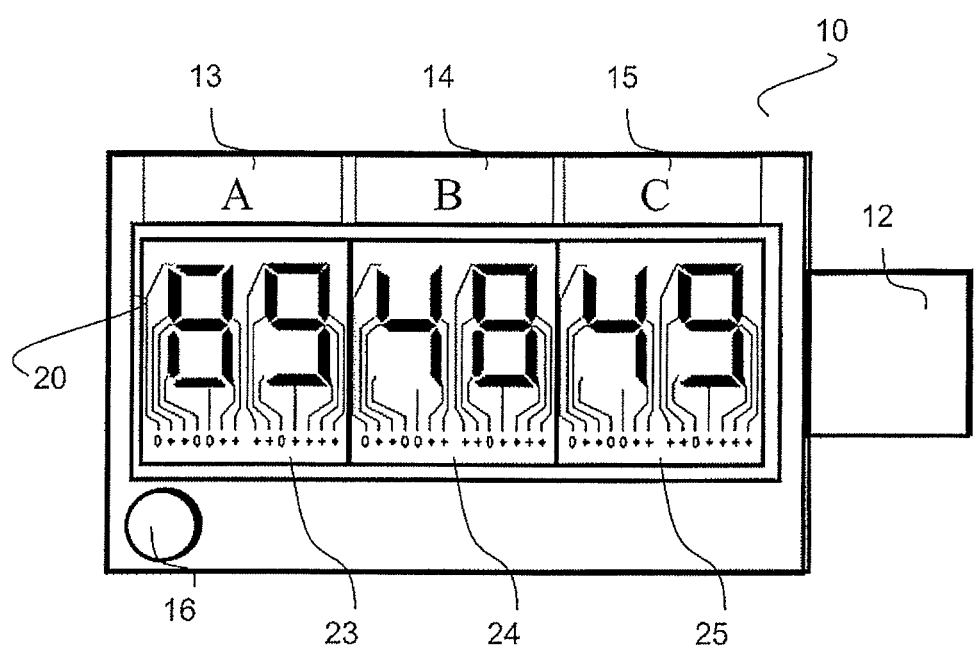

Other aspects, characteristics and advantages of the invention will become apparent on reading the following detailed description of the embodiments of the invention given by way of example only and with reference to the attached drawings which show:

FIG. 1: a flow chart showing the steps of the method according to an embodiment of the invention; and FIG. 2: an example of a client device according to the invention.

The invention proposes a method and a device for user authentication, based on an encryption function using a shared secret and a time variable, for the generation of single-use passwords. The function also depends on an additional variable, the value of which can be changed by the user if necessary. This value change takes place for example following a challenge from the server, which can be generated following a request from the user. On the one hand, the moment when the password is changed is not predictable. On the other hand, the value of the argument changes and consequently, the function value. Taking into account the usual properties of encryption functions, a fork bomb attack is thus much more difficult than with a conventional OTP system. The user may, preferably, communicate only a part of the new password, this according to a simplified challenge from the server. This substantially improves the ergonomics of the system. The principle behind the method according to the invention allows user authentication to be simplified, in particular in response to a user request.

With reference to FIG. 1, the method provides for a calculation step (step S30) by a client device of a first value of function $f(K,t,x)$.

Variable K is a secret shared by the server and the client device; Typically this relates to a secret key, i.e. a unique key which is normally known only to the two correspondents. As is known in the prior art, the encryption security depends on the confidentiality attributed to this common key.

The variable t depends on time in one way or another. Typically, this is a current time variable. In order to avoid synchronization problems on subsequent server-side verification, time slots can for example be allocated, as is known in the prior art. It is also possible to implement the variable t as a number incremented at each connection (thus evolving over time). Various techniques are known in the art for implementing the secret and the time variable.

According to the invention, the function also depends on the variable x, which has at least two values. To this end and according to a variant, this variable can be a one-bit-coded variable, an example of which will be given below.

The function $f$ is a function typically suitable for encryption or hashing or also for message authentication code or MAC. It is preferably a hash function or double hash function (for example MD5, SHA or developments of the latter), comprising a hash algorithm. As known in the prior art, such a function makes the values of a large set of values correspond to a reduced range of values. The algorithm allows a message digest of an initial message to be generated.

More precisely, for a hash function $f$, it is required that: $f(n) \neq f(m)$ implies $n \neq m$ and $f(n) = f(m)$ very probably implies $n=m$. If the set from which n is taken is greater than the set of values taken by f the latter property is difficult to evaluate. In fact, in a cryptographic context, a function $f$ is sought such that for any n for which the hash value f(n) is known, then it is very difficult (i.e. technically impossible or very unlikely) to calculate an m such that f(n)=f(m).

In a particularly simple and effective embodiment, the function uses a concatenated value of variables K, t and x. The calculation carried out can thus correspond to that of:

$$f(C=tKx)=f(K,t,x).$$

Variable x can for example be an additional bit, taken into account at the hash level. Coding x on an additional bit proves to be particularly simple and advantageous as this is sufficient to provide two possible values for the variable x.

By way of example, the time variable can be coded on a byte, such as the number 11001010. The secret or the key can for example have as a value the string 10110010101001111010101011000010 (shown here in bold to distinguish it from other values). It can also be sought to form:

$$f(K,t,x=0)=f \\ (11001010101100101010011110101011000010100); \quad (i)$$

or $$f(K,t,x=1)=f \\ (10010101011001010100111101010101011000010101). \quad (ii)$$

The above calculation step is carried out for a first value of x, for example x=0.

This calculation step is, if necessary, followed by a step (step S40) of providing a result of $f(K,t,x=0)$ to the server. This result can be provided by any means to the server, according to the hardware configuration envisaged. This result can in particular be sent by the client device after user validation, when this device is connected to the server (for example by means of a USB port, via a client computer connected to the server over the internet). In a variant, this result is displayed by the client device, by means of which this result can be communicated to the server by the user himself, in particular when the device is not connected.

The method according to the invention thus comprises a user authentication step (step S50), using a result of a calculation equivalent to the above calculation. In concrete terms, the server knows the secret, the time or the time slot, and thus has the information necessary to authenticate the user, a first time. Such a principle is known in the art, apart from the fact that here the argument is transformed by the variable x, and subsequently the value of function $f$.

Preferably, when a user makes a request (step S80) to the server or, alternatively, following this request (step S70), the user communicates to the server at least one part of a second value of function $f$ calculated by the client device for a second value of x (for example x=1 above). Changing the value of x can be carried out by the user himself. This point will be described with reference to FIG. 2.

The server can then itself verify the authentication according to the same principle of authentication. Thus subsequent accession to the user request can be subordinated to a verification of authentication by the server.

It should be noted that according to this principle, it is not necessary for the device to inform the user of each new password which may be produced for x=0. The user only needs to call the device when necessary. Thus, the user can for example call or control the device a first time to authenticate himself (x=0) then call it a second time for the issue of a new password (x=1), which allows the server to verify the authentication.

An application example is that of a user remotely managing a bank account. The user is authenticated a first time (as in step S50) by the bank server. This authentication allows him to access information relating to his bank account. Then, when the user wishes to carry out an operation on his account (user request) the server can submit the validation of this operation (i.e. accept the request) on condition that the user responds correctly to a challenge issued by the server.

The server issues a challenge relating to f(K, t, x=1). This challenge is received by the user (step S90).

Preferably, the server can issue a challenge only relating to one part of the result of f(K, t, x=1), for example only relating to two figures of said result (which in practice, ensures sufficient protection for verification of the authentication). Thus the user has only a reduced number of characters to communicate to the server. The ergonomics of the method are thus improved.

Moreover, the part of the result to be communicated to the server can be chosen at random by the latter. For example, the server can ask for the first two figures, or the next two, etc. of the result to be communicated to it, according to a random (thus not predictable) procedure. This further reduces the possibilities of hacking. To this end, a particularly advantageous device will be described with reference to FIG. 2.

When the user responds correctly to the challenge, his request can be accepted (step S140).

FIG. 2 shows an example of the client device 10 according to the invention. This device allows authentication of a user as well as verification of this authentication, as shown above.

This device is equipped with means of calculating the values of the function $f(K,t,x)$ of this function for one or other of said at least two values of x. The device also comprises user means 16 for changing variable x. This means is provided for example in the form of a simple button. Pressing this button makes it possible to change from x=0 to x=1.

The device 10 also comprises means of user activation 16 of the calculation by the device of the values of the function; as well as means of display 20 of a function value. This means can for example be a liquid crystal display.

Thus in one embodiment, the device can display by default a password corresponding to the secret and the connection or current time variable (for example a current time slot). This password can allow him to be authenticated by the server at any given moment. Later, in response to a challenge by the server, the user presses this button. The value of x is then switched.

Preferably, the means of change 16 and initiation 16 are integrated; Thus, when the user presses the button 16, he simultaneously displays the result of the calculation f(K, t, x=1).

Equally preferably, the means of display comprises separate display sections 23-25. These sections can for example be obtained by demarcating sections on the display screen 20 or by providing separate screens. A person skilled in the art will seek for example to space the display of characters between sections, in order to make them easier to read.

Also, the device is capable of displaying parts of a value of the function in respective display sections 23, 24, 25. Thus the user has available an ergonomic device, associated with the method described above. As described above, the server may show the challenge on one of these sections. For example the challenge may be: "Enter the two figures displayed in section A". Following this challenge, in the example shown in the figure, the user must enter the number 89.

With reference to the example of the application described above, typical challenges associated with operations on a bank account can be:

To read your balance, press the bypass button 16 and enter the number that appears under the letter C; and to order a new cheque book, press the bypass button 16 and enter the name that appears under the letter B.

According to an alternative, the device can comprise an LCD with ten different display sections corresponding to letters, for example ABCDEFGHIJ.

In a variant, the challenge can be implicit. For example, a transfer operation from the user's bank account is implicitly associated with providing a number displayed in section A, according to a procedure which is pre-established or brought to the attention of the user by default. In this case, the user provides the server with the corresponding number (for example by keying this number into a request box) at the same time as making the request.

According to another variant, the device also comprises means 12 for connection to the server, for transmitting a value of the function to the server, for example a USB port 12. Thus the provision of values for the function $f(K,t,x)$ can be transmitted directly from the client device when the latter is connected to the server, for example via a user's personal computer and the internet.

If necessary, only the values for f(K, t, x=0) need be sent to the server for authentication. In contrast, for increased security, the device can be designed in such a way that the values for f(K, t, x=1) are only available on the display.

According to another variant, the device can be provided with two different main display sections (for example, two different LCDs). One can display the values for f(K, t, x=0), while the other could display the values for f(K, t, x=1). In this way, the values f(K, t, x=0) and f(K, t, x=1) are available for display and the user can see each of these values at any moment. There is therefore no need to activate the calculation of f(K, t, x=1) by a specific action. Therefore, there is no need to equip the device with a button. Moreover, within each of the main display sections, the device can display parts of the values for the function $f$ in different display subsections, in the manner of display sections 23,24,25.

The invention will thus advantageously be applicable to payment terminals. For example, a challenge can be sought that corresponds to the sum of a transaction carried out thereby, for example in a store.

Moreover, the invention is not limited to the variants described above, but can be the subject of many other variations easily accessible to a person skilled in the art. By way of example, it is possible to implement a hash function with error tolerance. It is also possible to make use of the client device subject to validation by a personal static password, etc.

The invention claimed is:

1. User authentication device, provided with an encryption function of variables K, t, x, in which:
   K is a secret shared with a server;
   t is a time-dependent element; and
   x is a variable that may take on at least first and second predetermined and distinct values known by said user device and said server,
   the device comprising:
      means of calculation of encryption function results for one or other of said at least two values of x;
      instructions to perform a first calculation of an encryption function, with said parameter x being assigned said first value, with the means of calculation;
      means for requesting an authentication of the user by the server, said requesting comprising a first result being the result of said first calculation and said first value of said parameter x;
      instructions to perform a second calculation of said encryption function, with said parameter x being assigned a second value, with the means of calculation, obtaining a second result;
      instructions to receive, between the first calculation and the second calculation, a challenge for said device to provide to said server at least a part of said second result, the at least part of said second result having been chosen randomly, for verification of the authentication of the user by the server; and means for transmitting to said server a response to said challenge, said response comprising the at least part of the second result.

2. Device according to claim 1, wherein the device also comprises:
means for the user to change the variable x; and
means of activation by the user of the means of calculation of the encryption function values by the device.

3. Device according to claim 2, wherein the means of changing and activation are integrated.

4. Device according to claim 1, wherein the device also comprises means of display of a value of the encryption function, comprising different display sections, the device being capable of displaying parts of a value of the encryption function in respective display sections.

5. Device according to claim 1, wherein the means of calculation are capable of calculating an encryption function using a concatenated value of the variables K, t and x.

6. Device according to claim 1, wherein the variable x is a one-bit-coded variable.

7. Device according to claim 1, wherein the variable x has two values and is a one-bit-coded variable.

8. A server for strengthening a user authentication, said server comprising:
means for obtaining, from a client device, a first request for user authentication, comprising:
a first result being the result of a step of first calculation by the client device of an encryption function with parameters K, t, x, in which the parameter K is a secret shared by the server and the client device, the parameter t is a time-dependent element and the parameter x is a variable that may take on at least a first and a second predetermined and distinct values known by said user device and said server, said parameter x being assigned said first value; and
said first value of said parameter x;
means for determining an expected result by determining said encryption function with said parameters;
means for comparing said expected result with said first result;
means for authenticating said user when said expected result and said first result are identical;
means for strengthening the user authentication by said means for authenticating comprising:
means for determining a second result of said encryption function with parameter x being assigned said second value;
means for transmitting a challenge to said client device, said challenge being to provide to said server at least a part of said second result being chosen randomly;
means for receiving a response to said challenge by said client device; and
means for comparing said response to said randomly chosen part of said second result,
and
means for confirmation of the authentication of the user, when said response and said corresponding part of said second result are identical.

9. A method for strengthening user authentication by a server, said user using a client device, and said server performing the following steps:
obtaining, from said client device, a first request for user authentication, comprising:
a first result being the result of a step of first calculation by the client device of an encryption function with parameters K, t, x, in which the parameter K is a secret shared by the server and the client device, the parameter t is a time-dependent element and the parameter x is a variable that may take on at least first and second predetermined and distinct values known by said user device and said server, said parameter x being assigned said first value; and
said first value of said parameter x;
determining an expected result by determining said encryption function with said parameters;
comparing said expected result with said first result, and when said expected result and said first result are identical, the user is authenticated by said server, and the server further performs the following steps for strengthening the user authentication:
determining a second result of said encryption function with said parameter x being assigned said second predetermined and distinct;
transmitting a challenge to said client device, said challenge being to provide to said server at least a part of said second result being chosen randomly;
receiving a response to said challenge by said client device; and
comparing said response to said randomly chosen part of said second result, wherein when said response and said corresponding part of said second result are identical, the authentication of the user is confirmed by the server.

10. Method of strengthening authentication according to claim 9, wherein, said encryption function encrypts a concatenated value of parameters K, t and x, when determining one or both of the first and second results.

11. Method of strengthening authentication according to claim 9, wherein the parameter x is a variable having only two values and is a one-bit-coded variable.

12. Method of strengthening authentication according to claim 9, wherein the encryption function is based on a hash function.

* * * * *

UNITED STATES PATENT AND TRADEMARK OFFICE
CERTIFICATE OF CORRECTION

| | | |
|---|---|---|
| PATENT NO. | : 8,850,518 B2 | Page 1 of 1 |
| APPLICATION NO. | : 11/760063 | |
| DATED | : September 30, 2014 | |
| INVENTOR(S) | : Naccache | |

It is certified that error appears in the above-identified patent and that said Letters Patent is hereby corrected as shown below:

In the Claims
Column 8, Claim 9, line 31, after "distinct", insert --value--.

Signed and Sealed this
Twenty-third Day of December, 2014

Michelle K. Lee
*Deputy Director of the United States Patent and Trademark Office*